(12) United States Patent
Goulding et al.

(10) Patent No.: US 11,468,332 B2
(45) Date of Patent: Oct. 11, 2022

(54) DEEP NEURAL NETWORK PROCESSOR WITH INTERLEAVED BACKPROPAGATION

(71) Applicant: Raytheon Company, Waltham, MA (US)

(72) Inventors: John R. Goulding, Farmersville, TX (US); John E. Mixter, Tucson, AZ (US); David R. Mucha, Maranza, AZ (US); Troy A. Gangwer, Tucson, AZ (US); Ryan D. Silva, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1247 days.

(21) Appl. No.: 15/810,946

(22) Filed: Nov. 13, 2017

(65) Prior Publication Data

US 2019/0147342 A1 May 16, 2019

(51) Int. Cl.
*G06N 3/08* (2006.01)
*G06N 3/04* (2006.01)
*G06N 3/063* (2006.01)

(52) U.S. Cl.
CPC ........... *G06N 3/084* (2013.01); *G06N 3/0445* (2013.01); *G06N 3/0454* (2013.01); *G06N 3/063* (2013.01)

(58) Field of Classification Search
CPC ..................................................... G06N 3/084
USPC .......................................................... 706/25
See application file for complete search history.

(56) References Cited

U.S. PATENT DOCUMENTS

| 3,275,985 A | 9/1966 | Dunn et al. |
|---|---|---|
| 3,646,329 A | 2/1972 | Yoshino et al. |
| 4,727,505 A | 2/1988 | Konishi et al. |
| 4,748,674 A | 5/1988 | Freeman |
| 4,941,122 A | 7/1990 | Weideman |
| 4,951,239 A | 8/1990 | Andes et al. |
| 4,994,982 A | 2/1991 | Duranton et al. |
| 5,052,043 A | 9/1991 | Gaborski |
| 5,226,092 A | 7/1993 | Chen |
| 5,517,598 A | 5/1996 | Sirat |
| 5,590,218 A | 12/1996 | Ornstein |
| 5,796,925 A | 8/1998 | Deville |

(Continued)

FOREIGN PATENT DOCUMENTS

| WO | WO-2008067676 A1 | 6/2008 |
|---|---|---|
| WO | WO-2019094882 A1 | 5/2019 |

OTHER PUBLICATIONS

J. G. Eldredge and B. L. Hutchings, "RRANN: a hardware implementation of the backpropagation algorithm using reconfigurable FPGAs," Proceedings of 1994 IEEE International Conference on Neural Networks (ICNN'94), 1994, pp. 2097-2102 vol.4, doi: 10.1109/ICNN.1994.374538. (Year: 1994).*

(Continued)

*Primary Examiner* — James D. Rutten
(74) *Attorney, Agent, or Firm* — Schwegman Lundberg & Woessner, P.A.

(57) ABSTRACT

Processing circuitry for a deep neural network can include input/output ports, and a plurality of neural network layers coupled in order from a first layer to a last layer, each of the plurality of neural network layers including a plurality of weighted computational units having circuitry to interleave forward propagation of computational unit input values from the first layer to the last layer and backward propagation of output error values from the last layer to the first layer.

17 Claims, 8 Drawing Sheets

(56) References Cited

U.S. PATENT DOCUMENTS

| | | | |
|---|---|---|---|
| 2002/0147695 A1* | 10/2002 | Khedkar | G06N 3/0436 706/15 |
| 2010/0076915 A1 | 3/2010 | Xu et al. | |
| 2012/0166374 A1 | 6/2012 | Moussa et al. | |
| 2016/0210550 A1* | 7/2016 | Merrill | G06N 3/0454 |
| 2016/0267380 A1* | 9/2016 | Gemello | G06N 3/084 |
| 2016/0335536 A1* | 11/2016 | Yamazaki | G06N 3/0454 |
| 2016/0379137 A1* | 12/2016 | Burger | G06F 9/46 706/12 |
| 2017/0039472 A1* | 2/2017 | Kudo | G06N 3/063 |
| 2017/0109628 A1 | 4/2017 | Gokmen et al. | |
| 2017/0301063 A1* | 10/2017 | Merhav | G06K 9/00228 |
| 2018/0005111 A1* | 1/2018 | Chaudhari | G06N 3/084 |
| 2019/0043193 A1* | 2/2019 | Odaibo | G06K 9/00617 |
| 2019/0073583 A1* | 3/2019 | Chen | G06N 3/0454 |
| 2019/0122105 A1* | 4/2019 | Boybat Kara | G06N 3/063 |

OTHER PUBLICATIONS

F. Ortega-Zamorano, J. M. Jerez, D. Urda Munoz, R. M. Luque-Baena and L. Franco, "Efficient Implementation of the Backpropagation Algorithm in FPGAs and Microcontrollers," in IEEE Transactions on Neural Networks and Learning Systems, vol. 27, No. 9, pp. 1840-1850, Sep. 2016 (Year: 2016).*

X. Han, D. Zhou, S. Wang and S. Kimura, "CNN-MERP: An FPGA-based memory-efficient reconfigurable processor for forward and backward propagation of convolutional neural networks," 2016 IEEE 34th International Conference on Computer Design (ICCD), 2016, pp. 320-327, doi: 10.1109/ICCD.2016.7753296. (Year: 2016).*

P. Narayanan et al., "Toward on-chip acceleration of the backpropagation algorithm using nonvolatile memory," in IBM Journal of Research and Development, vol. 61, No. 4/5, p. 11:1-11:11, Jul. 1-Sep. 2017, doi: 10.1147/JRD.2017.2716579. (Year: 2017).*

"International Application Serial No. PCT/US2018/060611, International Preliminary Report on Patentability dated May 28, 2020", 9 pgs.

"International Application Serial No. PCT/US2018/060611, International Search Report dated Mar. 1, 2019", 4 pgs.

"International Application Serial No. PCT/US2018/060611, Written Opinion dated Mar. 1, 2019", 7 pgs.

"European Application Serial No. 18812008.3, Communication Pursuant to Article 94(3) EPC dated Oct. 18, 2021", 9 pgs.

"Revision—Unix & Linux Stack Exchange", <:https://unix.stackexchange.com/revisions/305752/1>, (Aug. 25, 2016).

Hwang, J N, et al., "Parallel algorithms/architectures for neural networks*", Journal of VLSI Signal Processing Systems for Signal, Image, and Video Technology, Springer, New York, NY, US, vol. 1, No. 3,, (Nov. 1, 1989), 221-251.

Topher, Kessler, "Making sense of inactive RAM—CNET", XP055849890, <https://www.cnet.com/tech/computing/making-sense-of-inactive-ram/>, (Oct. 3, 2010), 4 pgs.

* cited by examiner

DEEP NEURAL NETWORK PROCESSOR WITH INTERLEAVED BACKPROPAGATION

TECHNICAL FIELD

Embodiments generally relate to neural networks, and more particularly to neural network processors that interleave forward calculation of inputs and backward propagation of errors, such that they co-occur.

BACKGROUND

An artificial neural network (ANN) is a computational system including a large collection of simple neural units or processing elements (PEs) interconnected together in a fashion modeled after the network of neurons in a biological brain. ANNs are typically intended to solve problems in a manner similar to that of biological brains, and are typically trained to solve problems using a technique known as machine learning. A deep neural network (DNN) is an ANN with multiple hidden layers of PEs between an input layer of PEs and an output (classifier) layer of PEs. DNNs have the potential to model complex data using fewer PEs than a similarly performing shallow network (e.g., a network with only the input and output layers of PEs). DNNs may be used to classify vehicles in electro-optical (EO) or synthetic aperture radar (SAR) imagery or perform other image recognition applications that require a high ratio of memory access due to their high connectivity.

DETAILED DESCRIPTION

Figure 1:
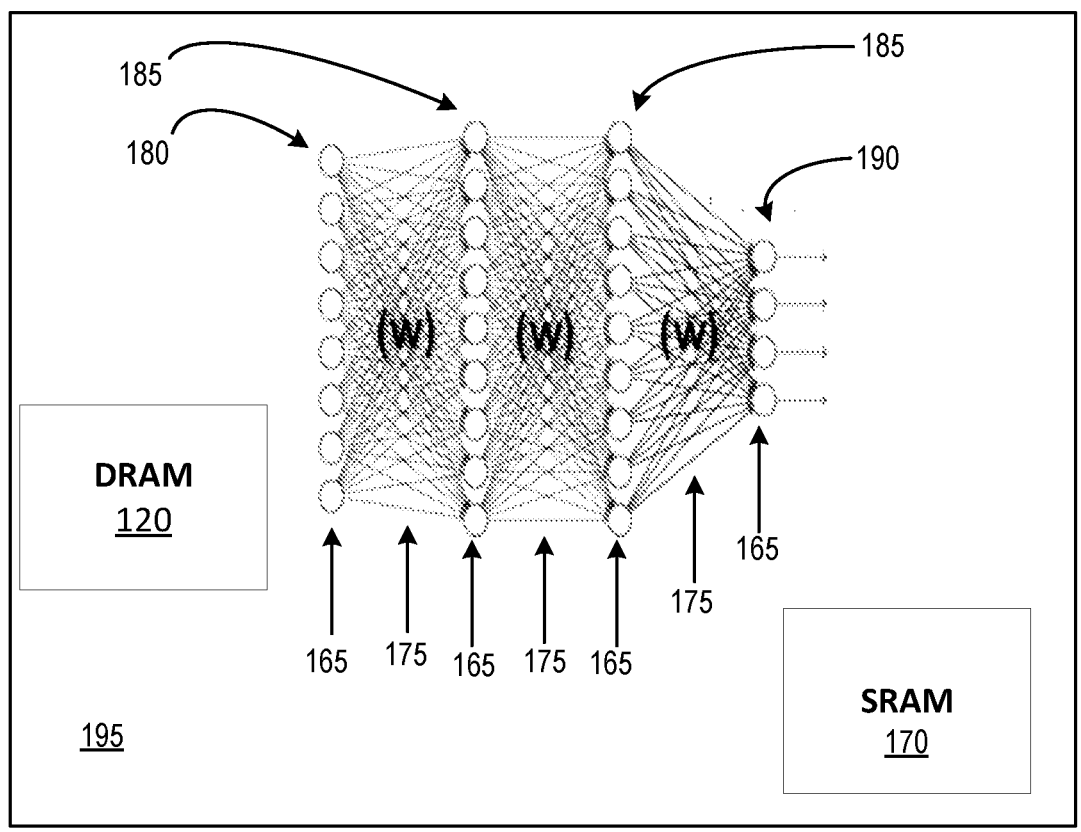
FIG. 1 illustrates, by way of example, a block diagram of an embodiment of a deep neural network (DNN).

The following description and the drawings sufficiently illustrate specific embodiments to enable those skilled in the art to practice them. Other embodiments may incorporate physical, functional, logical, electrical, process, cost, and other changes. Portions and features of some embodiments may be included in, or substituted for, those of other embodiments. Embodiments set forth in the claims encompass all available equivalents of those claims.

An implementation of an ANN in hardware can include a network of processing elements (PEs) with weight values associated with the interconnections between the PEs stored in a local or remote memory. The PE's computations can be performed and the results stored locally. Due to the capacity limitations of current hardware solutions (e.g., field programmable gate arrays (FPGAs)), the functional capabilities of ANNs implemented in this fashion are limited. For various applications, it is desirable to implement ANNs on a larger scale than achievable via a purely local network of PEs and local memory.

In various embodiments, an ANN may be configured in a non-local memory, converted into a stream of computer instructions, transferred to local processing circuitry (e.g., an FPGA), and executed entirely within the local processing circuitry. The local processing circuitry can include static random access memory (SRAM) to reduce both training and execution time of the ANN. A processor of the ANN (e.g., a central processing unit (CPU)) may be part of a low size, weight, and power (low-SWaP) system on chip (SoC) implementation incorporating the CPU, FPGA, on-chip SRAM, and external DRAM for training and execution of DNNs.

The application of Deep Neural Networks (DNNs) to low latency target recognition problems, such as vehicle classification in missile system imagery, is limited by how fast one or more images of a set of images can be classified. Likewise, training a DNN using large data sets and models leads to better accuracy and inference, but using large data sets also increases computation time (e.g., minutes, hours, days, etc.). One or more embodiments reduce DNN latency, make field training practical, and/or in-flight adaptation possible.

Embodiments include interleaving a forward calculation of an input with a backward propagation of errors, such as in a field programmable gate array (FPGA) (e.g., an accelerator circuit of the FPGA). The forward calculation and backward propagation can co-occur. The co-occurrence of the forward calculation and the backward propagation can help increase the use of limited FPGA memory resources, reduce power consumption, and reduce time to make a prediction or train a DNN.

Interleaved backpropagation is a DNN (on-chip) machine learning method that can help reduce energy use in a system on chip (SoC) processor. The SoC processor can employ a central processing unit (CPU), FPGA, on-chip memory (e.g., SRAM), and external memory (e.g., DRAM). DNNs such as AlexNet, which was created by personnel of Stanford Vision Lab, for example, comprises 240 MB of parameters (e.g., 61 million synapses, weights, and thresholds), making them unrealistic to embed in on-chip SRAM. Because SoCs are generally limited in memory size—there is limited FPGA fabric and/or SRAM to hold an entire DNN—only a portion of the DNN is implemented at any one time in an FPGA accelerator circuit.

In an interleaved backpropagation embodiment, both the forward and backward propagated results co-occur in an FPGA for each layer, intermediate calculation, and DRAM transfer, with intermediate results held in SRAM. The DNN error can be backward propagated (i.e., run backwards), such as to correct weights of PEs, reusing the same hardware-limited accelerator circuit in FPGA and at the same time the parameters (used in the forward calculation) are available in SRAM. These embodiments reduce SoC energy consumption, such as can be at least partially due to efficiently using SRAM and reducing use of DRAM. To help power efficiency, the neural network is not run backward serially, rather the network waits until weights are in active memory for use in a forward propagation and backpropagates error values.

A layer is an organizational construct that aggregates neurons having a common start time for their computation. The start of computation is dependent on either 1) receiving all signals from a plurality of prior neurons (e.g., a previous layer), 2) using a clock to create time intervals in which signals may be received, or 3) starting computation when any signal is received. A layer comprises one or more neurons that may be computed simultaneously for efficiency. Assuming a fully-connected network, for example, if there are 10 parallel computation units and 1-10 neurons in a layer, they would all be computed simultaneously in hardware when all of the neurons receive their signals. If there are 100 neurons, it would take 10 computation cycles to complete the layer computation, before the next layer's computation could start. A "free form" neural network is the extreme case and does not impose a layer construct at all, rather the start of computation for each neuron is dependent on receiving (and temporarily buffering/storing) signals from a plurality of connected neurons. Any of these layer constructs can benefit from interleaving forward and backward propagation.

FIG. 1 illustrates, by way of example, a block diagram of an embodiment of a deep neural network (DNN) 195. Processing circuitry (e.g., hardware processors, such as central processing units (CPUs), graphics processing units (GPUs), microcontrollers, field programmable gate arrays (FPGAs), or the like) may implement the DNN using a local and/or external memory and compute resources.

The DNN 195 may include a plurality of PEs 165 and local static random access memory (SRAM) 170. In various embodiments, other forms of memory circuitry may be used instead of or in addition to the SRAM 170, for example, dynamic random access memory (DRAM), flash memory, nonvolatile random access memory (NVRAM), nonvolatile memory (NVM), or the like. In some embodiments, the SRAM 170 may be partitioned into sections for data and for neural network parameters.

In one or more embodiments, the PEs 165 may include a Widrow's adaptive linear combiner, in which the output $y_k$ where k represents a discrete time may be represented by Equation 1 as follows:

$$y_k = \sum_{l=0}^{L} w_{lk} x_{lk} = W_k^T x_k \qquad \text{(Eq. 1)}$$

where L is the maximum number of weights w. In an embodiment, the PEs 165 may include a perceptron as a simple neural processor. The perceptron may include a Widrow's adaptive linear combiner followed by threshold-based switch to make a decision regarding the data input to the perceptron. In an embodiment, threshold-based switch may include a simple on/off threshold $\beta$ such that an output is TRUE, 1, or high if $y_k > \beta$ and FALSE, 0, or low otherwise. In an embodiment, the threshold-based switch may include a nonlinear function, (e.g., a sigmoid), a rectified linear unit (ReLU) function, a diode function, or other function.

The PEs 165 may perform a forward propagation of an input in the DNN 195. Each of the PEs 165 in a first or input layer 180 may receive an input, such as from one or more external sources (e.g., an SRAM), and multiply the input by a weight factor. The weight factor may be different for each of the inputs. The weight factors for one or more of the PEs 165 may be stored in the DRAM 120 and may be retrieved by a PE 165 and/or stored in the SRAM 170 for retrieval by the PE 165. The PEs 165 within the input layer 180 may then work (in parallel) to perform a computation on the weighted inputs and output a result.

How the PEs 165 perform the computation may depend upon the form of the PEs 165. Each of the PEs 165 in the second and subsequent hidden layers 185 and the final or classifier layer 190 of the DNN 195 may receive an input from one or more PEs 165 of a prior hidden layer 185 or the input layer 180, and multiply the input by a weight factor 175. The weight factor 175 may be different for each of the inputs, and may be stored in the DRAM 120 and retrieved by the PE 165 and/or stored in the SRAM 170 for retrieval by the PE 165. The PEs 165 may then perform a computation on the weighted inputs and output a result. All the PEs 165 of the second layer 185 may wait for all the PEs 165 of the input layer 180 to complete their computations prior to beginning computation. Likewise, each of the subsequent layers 185 may wait for all the PEs 165 of its immediately prior layer 185 to complete prior to beginning computation. In this way, the PEs 165 of each layer of the DNN 195 may operate in parallel. Computational results of the PEs 165 can be provided to the DRAM 120 to be stored.

The SRAM 170 may include weight data for the PEs 165 of each layer 180, 185, 190 of the DNN 195 as well as input and output registers to permit the PEs 165 to step through each of the layers of the DNN 195 from the input layer 180 to the classifier layer 190 while the PEs 165 read input data from the SRAM 170 and write output data to the SRAM 170 corresponding to each layer of the DNN 195. By not writing output data to the DRAM 120 after processing by each layer 180, 185 is complete and by not reading input data from the DRAM 120 at the start of processing by each layer 185, 190, efficiency is increased and power consumption is reduced. For example, power consumption may be reduced by a factor of over 100 by saving intermediate data in local SRAM 170 vs. in the DRAM 120. In various embodiments, the data in the SRAM 170 may be stationary while the parameters of the DNN 195 cycle through the data.

In previous solutions, after an input has been through a forward propagation through the DNN 195, a backward propagation of error may be performed through the DNN 195. In a backward propagation modified weights associated with each of the PEs 165 are stored in the DRAM 120 or SRAM 170 for future reference or use. In embodiments herein, backward propagation of errors is interleaved with the forward propagation, such that they co-occur.

The DNN 195 may be used to determine a prediction. For example, based on at least a portion of an input image represented by the input data 140, a topology of the DNN 195, and weights determined according to training the DNN 195 to recognize a vehicle of a certain type, the CPU 115 may analyze the output data 145 to determine whether the input image represented by the input data 140 includes an image of a vehicle of the certain type.

In various embodiments, other forms of memory circuitry may be used instead of or in addition to the DRAM 120, for example, static random access memory (SRAM), flash memory, nonvolatile random access memory (NVRAM), nonvolatile memory (NVM), etc.

The PEs 165 may process the instruction streams using pipelined logic and math functions. Each instruction may be processed in the order in which it is received. Simple opcodes may be processed in a single clock cycle, while more complex opcodes, including those requiring mathematical computations, may be processed in multiple clock cycles. Computational behavior of a PE 165 may depend upon its received instruction and the PE's selected operating mode (forward or backward propagation), which can be determined by a processor via a memory-mapped register setting.

To ensure data coherency, the PEs 165 may also include logic for synchronizing the start of computation of each layer of the neural network. When a PE 165 receives an instruction, it may halt operation until all PEs 165 receive the same instruction. In this way, all PEs 165 may complete processing of the current layer and store results in their respective output buffers before starting computation of the next layer.

Forward propagation of the neural network may begin by providing an instruction stream transfer (e.g., from the DRAM 120) to the PEs. As each PE 165 receives instructions, they may be decoded and executed. The first instructions may set the learning rate and the activation functions of the PE 165. Next, the PE 165 may receive and process instructions, which pass weight values along with the memory address of the input data for the PE 165 to read in and process. The PE 165 may sum the product of the weight value with the data from the input buffer. The PE 165 may receive an instruction that causes the sum to be applied to the activation function and the result may be stored in the PE's output buffer.

After all of the PEs 165 have completed processing of their current layer, their respective output buffers may be combined and provided as an input buffer for processing the next layer, unless the classifier layer 190 was the most recently processed layer. If the most recently processed layer was the classifier layer 190, a prediction may be made based on the analysis of the combined output buffer of the classifier layer 190.

When interleaved backward propagation is performed, it may begin with the classifier layer 190. In interleaved backward propagation a processor may calculate an error present in the classifier layer 190 and then initiate forward propagation beginning at the input layer 180. The forward propagation may halt at the layer 185 immediately prior to the classifier layer 190 (e.g., classifier layer—1). The output buffer corresponding to the layer 185 immediately prior to the classifier layer 190 (e.g., classifier layer—1) may include data for calculating an adjustment to the weights of the classifier layer 190. After the weights of the classifier layer 190 have been adjusted, the weights may be transferred to the DRAM 120 and the processor may initiate forward propagation from the input layer 180 to layer immediately prior to the last layer at which the prior forward propagation halted (e.g., two layers 185 prior to the classifier layer 190, or classifier layer—2). The error for the layer immediately prior to the classifier layer 190 (e.g., classifier layer—1) may be calculated using the output data of the layer 185 that is two layers 185 prior to the classifier layer 190 (e.g., classifier layer—2). The weights of the layer immediately prior to the classifier layer 190 (e.g., classifier layer—1) may be adjusted and transferred to the DRAM 120. This process may be performed a total of N−1 times, where N is the total number of layers from the input layer 180 to the classifier layer 190, until the classifier layer—n=the input layer 180, where n ranges from 1 to N−1. The weights of the input layer 180 may not be adjusted, and backward propagation may be considered complete at that point.

More details regarding interleaving forward propagation and backward propagation are provided regarding FIGS. 2-7.

Figure 2:
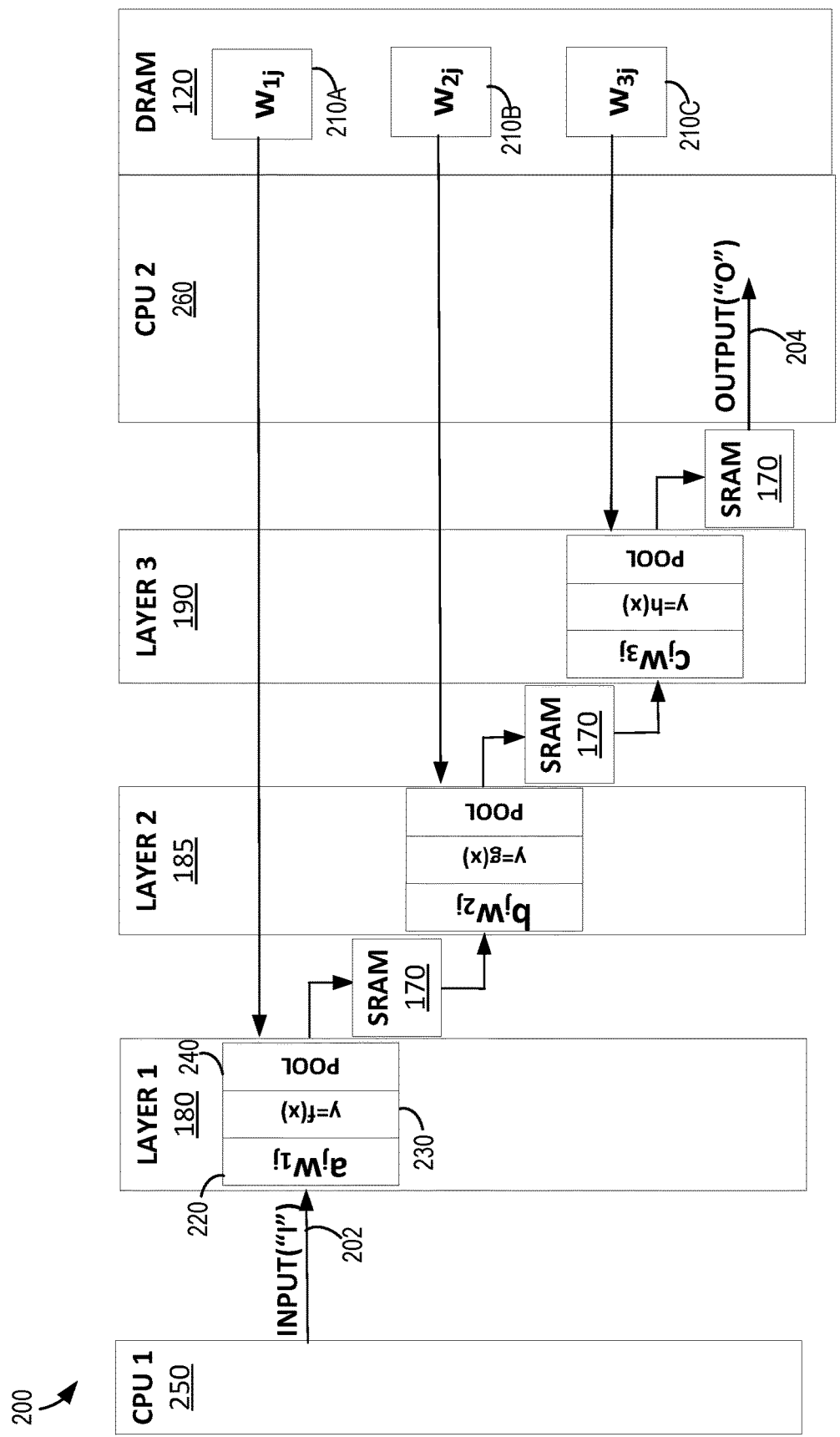
FIG. 2 illustrates, by way of example, a diagram of an embodiment of a DNN system.

FIG. 2 illustrates, by way of example, a diagram of an embodiment of a DNN system 200. The DNN system 200 as illustrated includes first and second processors 250 and 260, neural network layers including an input layer 180, a hidden layer 185, and a classifier layer 190, a DRAM 120, and an SRAM 170. The processor 250 can implement the neural network layers 180, 185, and 190. In one or more embodiments, the processor 250 manages an FPGA accelerator circuit (via configuring memory-mapped register settings, direct memory access (DMA), linked-lists, etc.) to implement the neural network layers 180, 185, and 190. The processor 260 can manage output, error calculation, or the like. In one or more embodiments, the functionality of the processors 250 and 260 can be implemented using a single processor or more than two processors.

The processor 250 provides input 202 to the input layer 180. The input layer 180 performs operations 220, 230, and/or 240 on the input. The processor 250 can retrieve, from the DRAM 120, weights 210A to be used by the input layer 180 in performing a calculation. The operation 220 can include multiplying the input ($a_j$) by a retrieved corresponding weight. The operation 230 can include applying a transfer function to result of the multiplication from operation 220. At operation 240, results from multiple PEs 165 of the input layer 180 can be pooled, such as by combining the results, mathematically and/or into a vector or matrix, of the operation 230. Results of the operation 240 can be stored in the SRAM 170. Results of the operation 240 can be retrieved from the SRAM 170 and provided to the hidden layer 185 as input. Note that the operation 240 is optional. In such embodiments, the results of the operation 230 can be stored in the SRAM 170 and provided to the hidden layer 185 as input. Both results are illustrated as being $b_j$ in the FIGS.

The layers 185 and 190 perform operations similar to the input layer 180, with the layers 185 likely including different weights, different inputs, different transfer functions, and/or different pooling. The processor 250 retrieves, at or around the time the layer 185 is to perform operations on an input, weights 210B from the DRAM 120. The layer 185, using the weights, $w_{2j}$, and transfer function g(x), processes the input $b_j$ in a manner similar to the layer 180 to produce output $c_j$, which is stored in the SRAM 170 and used as an input to the layer 190. The processor 250 retrieves, at or around the time the layer 190 is to perform operations on an input, weights 210C from the DRAM 120. The layer 190, using the weights, $w_{3j}$, and transfer function h(x), processes the input $c_j$ in a manner similar to the layer 180 to produce output $o_j$, which is stored in the SRAM 170 and provided to the processor 260 and/or stored in the DRAM 120.

Figure 3:
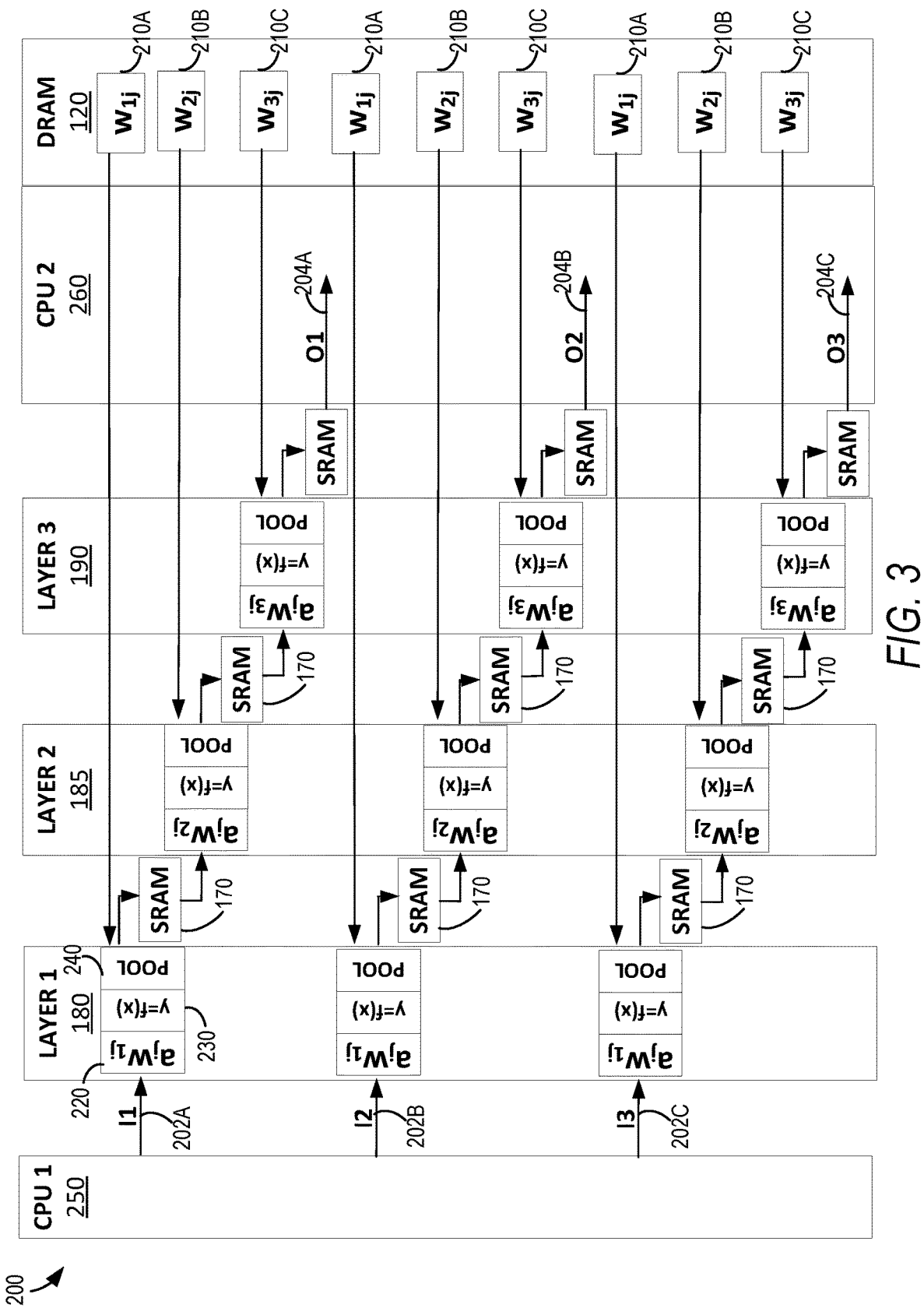
FIG. 3 illustrates, by way of example, another diagram of the embodiment of the DNN system of FIG. 2.

FIG. 3 illustrates, by way of example, another diagram of the embodiment of the DNN system 200. The DNN system 200 of FIG. 3 illustrates multiple iterations of inputs 202A, 202B, and 202C being converted to outputs 204A, 204B, and 204C, respectively. The inputs 202A-202C can include one or more images, audio recordings, sensor readings, or the like. The outputs 204A-204C can indicate a number that can be interpreted by the processor 260 to determine subject of the image, subject of the audio recording, whether a fault condition exists in a manufacturing facility, a security breach has or will occur, an action to be taken, or the like. Not all components of the system 300 include reference numbers so as to not obscure the view. For example, labels "170" are not provided on all instances of the SRAM in FIG. 3.

Figure 4:
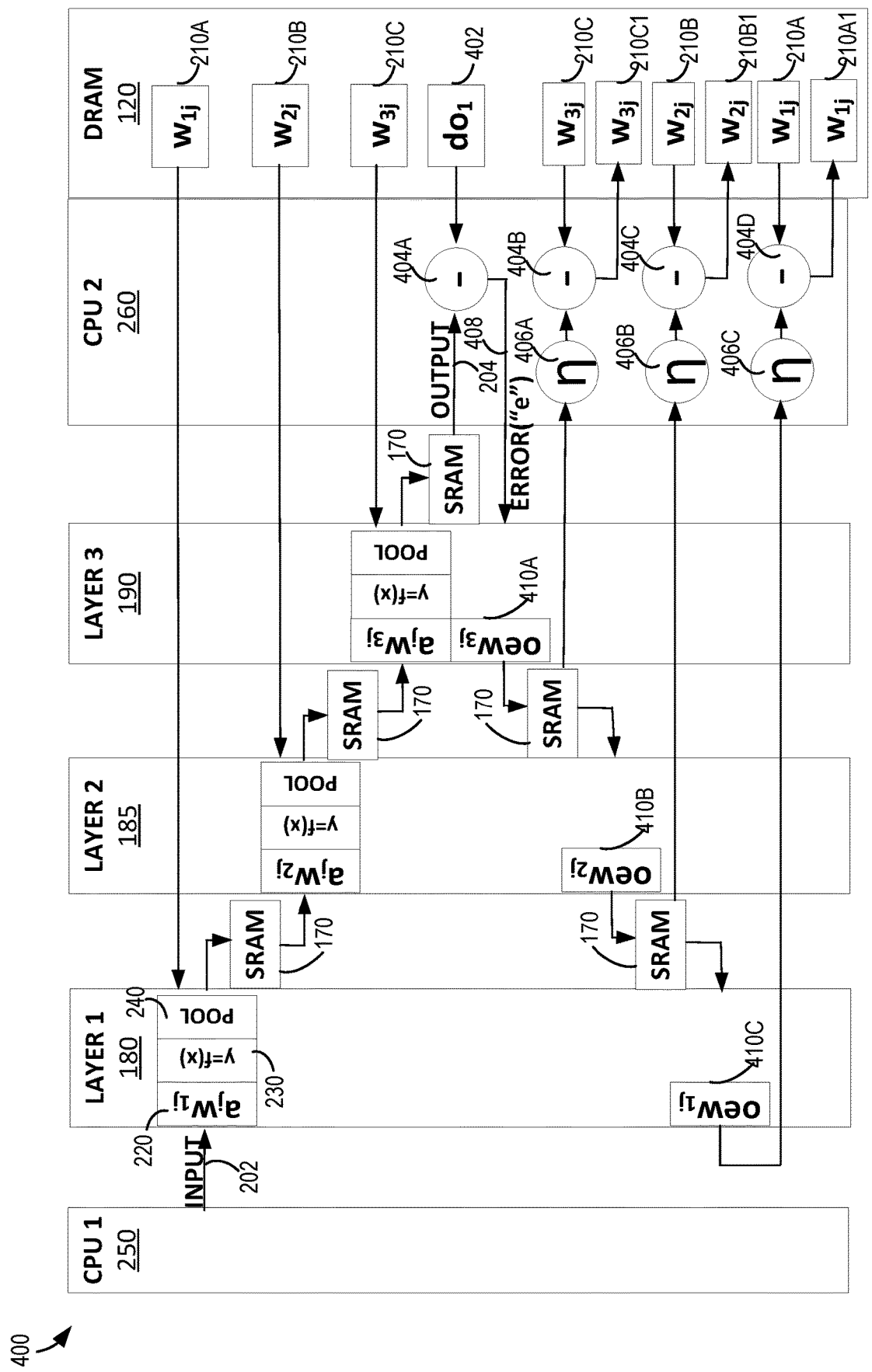
FIG. 4 illustrates, by way of example, a diagram of an embodiment of a DNN system that includes both forward propagation of input to output and backward propagation of error to inputs of the layers of the neural network.

FIG. 4 illustrates, by way of example, a diagram of an embodiment of a DNN system 400 that includes both forward propagation of input to output and backward propagation of error to inputs of the layers 180, 185, and 190. The DNN system 400 accomplishes the forward propagation and the backward propagation in separate time frames. The forward propagation is performed, and the backward propagation does not begin until forward propagation is complete. A next forward propagation will not begin until backward propagation is complete.

The output 204 is created based on input 202 as described with regard to FIG. 2. For backward propagation, the processor 260 can determine a difference between the output 204 and a desired output 402, at operation 404A. The result, error "e", can be provided to the classification layer 190. The layer 190 can use the error as an input and propagate the error to the weight, $w_{3j}$, or other input. The layer 190 can perform an operation 410A using the error. The operation 410A as illustrated includes an operation (e.g., a multiplication) that is a function of the output, error, and weight. The result of the operation 410A can be stored in the SRAM 170 and provided to the processor 260. The processor 260 can determine an amount to adjust the weight, $w_{3j}$. The amount can be determined by performing an operation 406A on the result of the operation 410A. The operation 406A can include multiplying by a constant, η, a function that depends on a change in the error and/or a change in the weight, or a combination thereof. The weight 210C can be adjusted by an amount equal to the result of the operation 406A, at operation 404B. A new weight 210C1 can be stored in place of the weight 210C, in the DRAM 120. The error can be further propagated to the layer 185 and then to the layer 180.

The result of the operation 410A can be provided to the layer 185. The layer 180 can propagate results of the operation 410A to its inputs and determine a result, such as by performing operation 410B. The result of the operation 410B can be provided to the SRAM 170, the processor 260, and the layer 180. The processor 260 can perform an operation 406B, similar to the operation 406A, and adjusts the weight 210B, $w_{2j}$, at operation 404C, based on the result of the operation 406B. The result of the adjustment can be stored as a new weight 210B1 in place of the weight 210B in the DRAM 120. Similar operations 410C, 406C, and 404D can be performed to update weight 210A, $w_{1j}$, to weight 210A1 in the DRAM 120.

Figure 5:
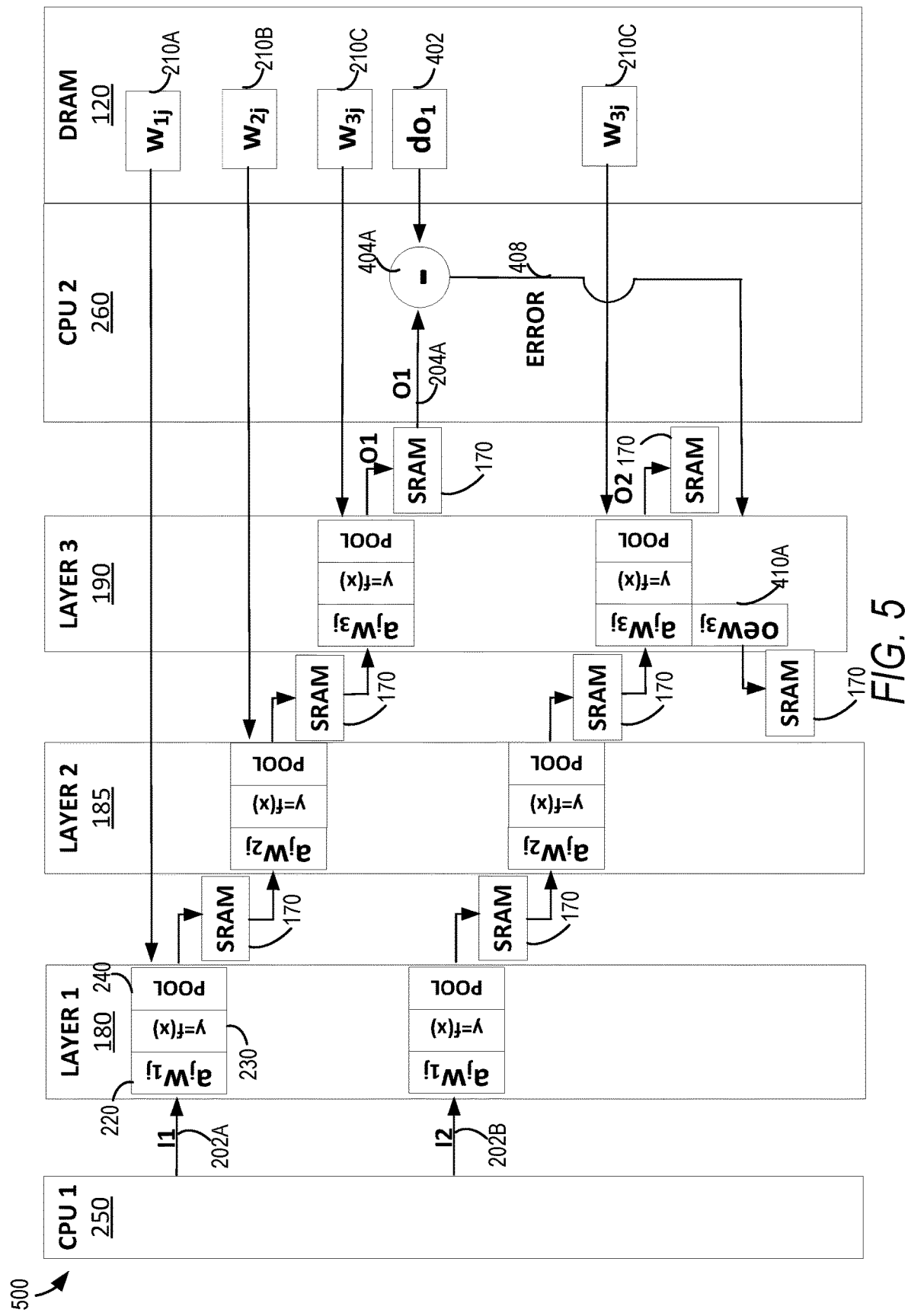
FIG. 5 illustrates, by way of example, a diagram of an embodiment of a DNN that includes interleaved forward propagation (of inputs) and backward propagation (of errors).

FIG. 5 illustrates, by way of example, a diagram of an embodiment of a DNN 500 that includes interleaved forward propagation (of inputs) and backward propagation (of errors). The DNN 500 is more efficient than a DNN that performs temporally separate. The efficiency savings are from reduced DRAM accesses, thus saving time, power consumption, and computation cycles. The DRAM accesses are reduced by performing operation 410A at a time that the weight 210C is locally available to the layer 190 (a time at which the weight $w_{3j}$ is in the SRAM 170), operation 410B at a time that the weight 210B is locally available to the layer 185 (a time at which the weight $w_{2j}$ is in the SRAM 170), and operation 410A at a time the weight 210A is locally available to the layer 180 (a time at which the weight $w_{1j}$ is in the SRAM 170). The interleaving can reduce a number of reads from the DRAM 120 to retrieve weights by up to 50%. The number of reads from the SRAM 170 increases in the interleaved embodiments, but SRAM access takes less time and less power than DRAM accesses, thus saving time and power.

A forward propagation of the input 202A to produce output 204A proceeds as discussed previously. The error in the output 204A, O1, is determined at operation 502 and backpropagated to the layer 190 during a forward propagation of a next input 202B. The layer 190 can use the error at operation 410A, such as at a time the weight 210C is available for the forward propagation. The error can be propagated to the layers 185 and 180, sequentially, such as described with regard to FIG. 4 and further discussed with regard to FIGS. 6 and 7.

Figure 6:
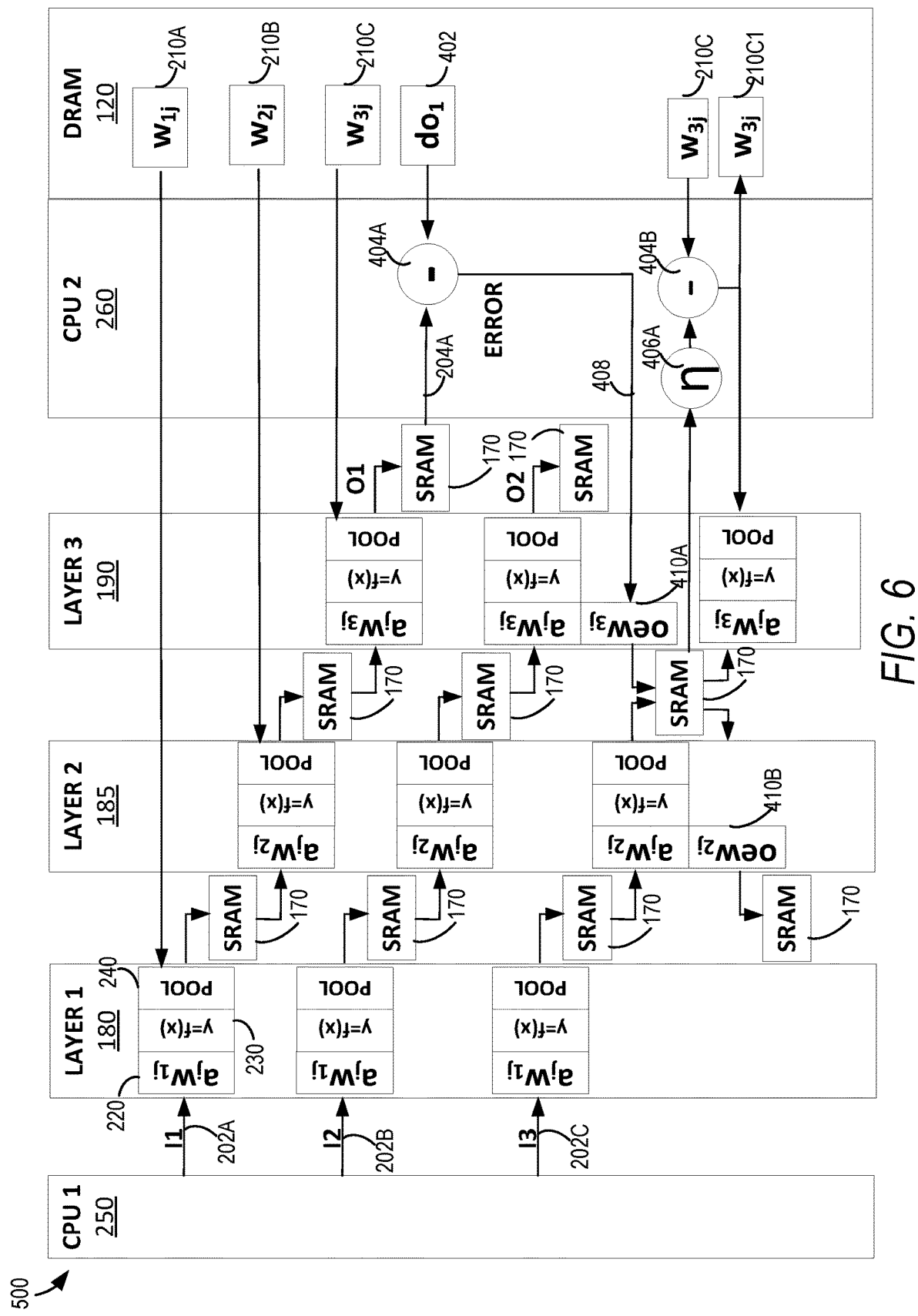
FIG. 6 illustrates, by way of example, a diagram of the embodiment of the DNN with further interleaved forward propagation and backward propagation.

FIG. 6 illustrates, by way of example, a diagram of the embodiment of the DNN 500 with further interleaved forward propagation and backward propagation. The DNN 500 of FIG. 6 includes the operations and components of the DNN 500 of FIG. 5 with an additional input 202C and propagated to the layer 190 and the error 408 further backpropagated to the layer 185. The error 408 can first be backpropagated to the layer 190. At a time in which the weight 210B, $w_{2j}$, is available in the SRAM 170, the layer 185 can backpropagate the error to its input(s). The weight 210C can be updated based on the backpropagation to a new weight 210C1. The DNN 500 as illustrated demonstrates that additional weight retrievals are not needed for backpropagation.

Figure 7:
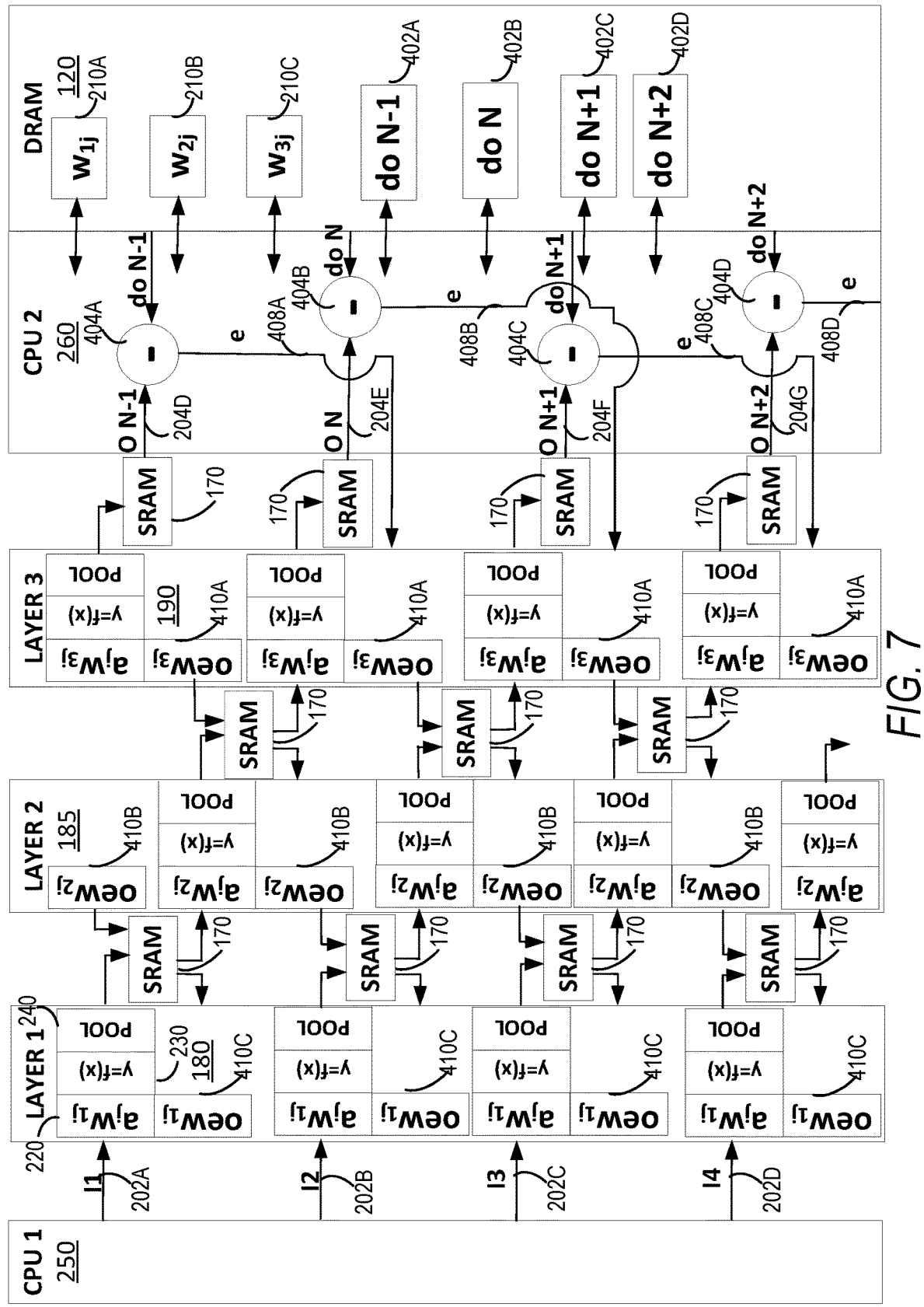
FIG. 7 illustrates, by way of example, a diagram of an embodiment of the DNN of FIG. 5 that is generalized and includes even further interleaved forward propagation and backward propagation.

FIG. 7 illustrates, by way of example, a diagram of an embodiment of the DNN 500 that is generalized and includes even further interleaved forward propagation and backward propagation. Picking up where FIG. 6 leaves off, a result of the operation 410B is provided to the SRAM 170. The result is available to the layer 180 for backpropagating error to its inputs. The layer 180 can perform an operation 410C to propagate the error to its inputs. The weight 210A, $w_{1j}$, may be updated by performing operation 406C (see FIG. 4) on the result of the operation 410A. The result of the operation 406C can be subtracted, at operation 404D, from the weight 210A, such as to create an updated weight 210A1.

After a first few forward propagations and interleaved backward propagations, the weights 210A, 210B, and 210C for each layer can be updated with every backward propagation. In the embodiment of FIG. 7, the weights 210A-210C can be updated every backward propagation after the third input. For DNNs with more/fewer layers or different configurations, this number can be different. In one or more embodiments, the layer 190, rather than the processor 260, can determine a difference between an output 204D-204G and a desired output 402A-402D (e.g., the layer 190 can perform operations 404A-404D). In one or more embodiments, the layers 180, 185, or 190 can determine an amount to adjust corresponding weights 210A-210C, respectively (e.g., the layers 180, 185, and 190 can perform operations 406A-406C and 404B-404D, respectively).

One or more embodiments can use components with mixed precision (e.g., components with differing bit widths). For example, the processor 250 may operate at a 32-bit width, but the layers 180, 185, or 190 or processor 260 may operate at a different bit width. One or more embodiments may include stochastic rounding. In stochastic rounding, error between successive feed forward errors can be batched to create a bigger delta and provide a bigger change in the inputs to the layers 180, 185, and 190.

While the embodiments shown in the FIGS. illustrate DNNs with only three layers, DNNs can include more than three layers. Such DNNs are within the scope of embodiments described.

Figure 8:
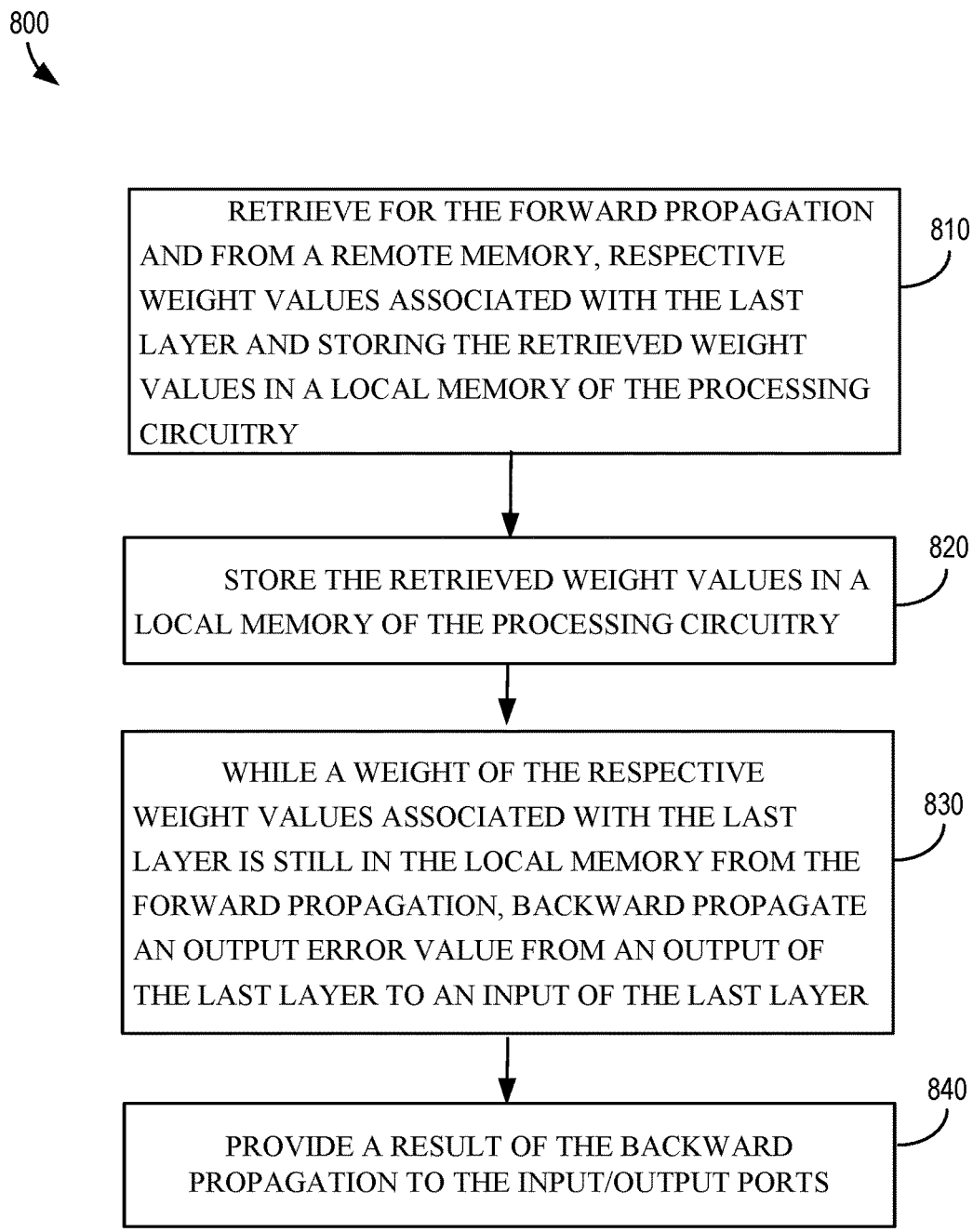
FIG. 8 illustrates, by way of example, a diagram of an embodiment of a method for interleaving forward propagation and backward propagation.

FIG. 8 illustrates, by way of example, an embodiment of a method 800 for interleaved backward propagation and forward propagation. The method 800 includes performing interleaved forward propagation and backward propagation for a deep neural network comprising a plurality of neural network layers coupled in order from a first layer to a last layer, each of the plurality of neural network layers including a plurality of weighted computational units, and input/output ports providing input to and receiving output from the plurality of neural network layers. The method 800 can be performed by the processor 250, neural network layers 180, 185, and 190, the processor 260, the SRAM 170, the DRAM 120, or other components discussed herein. The method 800 as illustrated includes retrieving for the forward propagation and from a remote memory, respective weight values associated with the last layer, at operation 810; storing the retrieved weight values in a local memory of the processing circuitry, at operation 820; while a weight of the respective weight values associated with the last layer is still in the local memory from the forward propagation, backward propagating an output error value from an output of the last layer to an input of the last layer, at operation 830; and providing a result of the backward propagating to the input/output ports, at operation 840.

The method 800 can further include multiplying a plurality of computational unit input values by corresponding weight values to produce a plurality of weighted input values, the plurality of computational unit input values received from a lower-numbered layer of the plurality of neural network layers when the respective weighted computational unit is not in the first layer or received from the input/output ports when the respective weighted computational unit is in the first layer. The method 800 can further include performing a computational function on the plurality of weighted input values to produce a plurality of computational function results. The method 800 can further include transmitting the plurality of computational function results to a higher-numbered layer of the plurality of neural network layers when the respective weighted computational unit is not in the last layer or to the input/output ports when the respective weighted computational unit is in the last layer. The method 800 can further include receiving a plurality of error values from the higher-numbered layer when the respective weighted computational unit is not in the last layer or from the input/output ports when the respective weighted computational unit is in the last layer, each of the plurality of error values corresponding to a different weight value of the respective weighted computational unit. The method 800 can further include backpropagating the plurality of error values to the lower-numbered layer when the respective weighted computational unit is not in the first layer or to the input/output ports when the respective weighted computational unit is in the first layer.

The operation 830 can further include multiplying the plurality of error values by the corresponding weight values of the respective weighted computational unit to produce a plurality of backpropagating results. The operation 830 can further include transmitting the plurality of backpropagating results to corresponding ones of the plurality of weighted computational units of the lower-numbered layer when the respective weighted computational unit is not in the first layer or to the input/output ports when the respective weighted computational unit is in the first layer.

Transmitting the plurality of computational function results to a higher-numbered layer for the respective weighted computational unit can include writing the plurality of results to a local memory. The method 800 can further include receiving the plurality of computational unit input values from a lower-numbered layer of the plurality of neural network layers when the respective weighted computational unit is not in the first layer is by reading the computational unit input values from the local memory. The method 800 can further include transmitting the plurality of backpropagating results to corresponding ones of the plurality of weighted computational units of the lower-numbered layer when the respective weighted computational unit is not in the first layer is by writing the plurality of backpropagating results to the local memory. The method 800 can further include receiving the plurality of error values from the higher-numbered layer when the respective weighted computational unit is not in the last layer is by reading the plurality of error values from the local memory.

The method 800 can further include subtracting a corresponding predefined desired result from each of the plurality of computational function results transmitted to the input/output ports by the plurality of weighted computational units in the last layer to determine the plurality of error values for the plurality of weighted computational units in the last layer. The method 800 can further include transmitting the plurality of error values to the processing circuitry for the plurality of weighted computational units in the last layer. The method 800 can further include for each of the plurality of weighted computational units, multiplying the plurality of backpropagating results transmitted by the respective weighted computational unit by a multiplication factor to determine a plurality of multiplying results, and subtracting the plurality of multiplying results from the corresponding weights for the respective weighted computational unit to determine updated weights for the respective weighted computational unit.

The method 800 can further include computing updated weight values for each of the plurality of weighted computational units according to the backpropagated output error values. The method 800 can further include transmitting the updated weight values to the plurality of weighted computational units.

The method 800 can further include, wherein the backpropagation of the output error values from the last layer to the first layer is performed when weight values for the respective weighted computational units are in active memory of the respective weighted computational units, the weight values used to perform computations by the weighted computational units during both the forward propagation and the backward propagation. The method 800 can further include, wherein the backpropagation of the output error values from the last layer to the first layer is performed by multiplying the backpropagated error values received by each of the plurality of weighted computational units by corresponding weight values of the respective weighted computational units to produce backpropagating multiplication results, and transmitting the backpropagating multiplication results to connected one or more weighted computational units of a preceding layer in the order from the first layer to the last layer when the respective weighted computational units are not in the first layer or transmitting the backpropagating multiplication results to the input/output port when the respective weighted computational units are in the first layer.

The FIGS. depict only a single feed-forward and feedback direction for propagating signals through a network. This is done for clarity. Some neural networks, such as the Boltzmann Machine, receive signals from more directions, i.e., computation is based on receiving signals from the forward, backward, and intra-layer (or within the same layer) neurons-to-neuron connections. Nevertheless, interleaving forward and backward propagation in such networks is possible. This is at least because there is always a defined 1) input and output of the network and 2) there is a method for generating and propagating the feedback or corrective error signal through the network.

Embodiments may be implemented on mobile (cell phones & tablets), security devices, commercial unmanned aerial vehicles (UAVs) & robotics, and/or Internet/Internet of Things (IoT) devices, among other devices.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as an FPGA or an ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., an FPGA or an ASIC. The computing system may include clients and servers.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Embodiments can be understood through example embodiments.

Example 1 includes processing circuitry for a deep neural network, the processing circuitry comprising input/output ports, and a plurality of neural network neurons organized into layers, each layer including at least one neuron, the layers organized from a first layer to a second, hidden layer, to a third, last layer, at least one neuron from the first layer is coupled to one or more of the input ports and to at least one neuron of a higher numbered layer and/or the output ports, at least one neuron from the second layer is coupled to at least one of the input ports and/or the at least one neuron of the first layer and the at least one neuron of the third layer and/or output ports, and at least one neuron of the third layer is coupled to the input ports and/or at least one neuron of the lower-numbered layers and to at least one of the output ports, each of the plurality of neural network neurons including a weighted computational unit having circuitry to interleave forward propagation of computational unit input values from the first neuron to the last neuron and backward propagation of output error values from the last neuron to the first neuron.

In Example 2, Example 1 can further include, wherein interleaving forward propagation and backward propagation includes, retrieving for a forward propagation and from a remote memory, one or more weight values associated with at least one neuron of the last layer and storing the retrieved one or more weight values in a local memory of the processing circuitry, and while a weight value associated with the last layer is still in the local memory from the forward propagation, backward propagating an output error value from an output of the last layer to an input of the last layer using the weight value, and providing a result of the backward propagating to the input/output ports.

In Example 3, Example 2 can further include, wherein each of the weighted computational units includes circuitry to multiply a plurality of computational unit input values by corresponding weight values of the weight values to produce a plurality of weighted input values, the plurality of computational unit input values received from an input port of the input ports and/or at least one neuron of the lower-numbered layers, circuitry to perform a computational function on the plurality of weighted input values to produce a plurality of computational function results, circuitry to transmit the plurality of computational function results to at least one neuron of a higher-numbered layer and/or at least one of the output ports, circuitry to receive a plurality of error values from at least one of the output ports and/or a higher-numbered layer, each of the plurality of error values corresponding to a different weight value of the respective weighted computational unit, and circuitry to backpropagate the plurality of error values to at least one neuron of the lower-numbered layer when the respective weighted computational unit is not in the first layer or to the input/output ports when the respective weighted computational unit is in the first layer.

In Example 4, Example 3 can further include, wherein the circuitry to backpropagate the plurality of error values includes circuitry to multiply the plurality of error values by the corresponding weight values of the respective weighted computational unit to produce a plurality of backpropagating results, and circuitry to transmit the plurality of backpropagating results to a corresponding weighted computational unit of the lower-numbered layer when the respective weighted computational unit is not in the first layer or to the input/output ports when the respective weighted computational unit is in the first layer.

In Example 5, Example 4 can further include local memory, wherein the circuitry to transmit the plurality of computational function results to a higher-numbered layer for the respective weighted computational unit includes circuitry to write the plurality of results to the local memory, the one or more computational unit input values are received from a lower-numbered layer of the plurality of neural network layers when the respective weighted computational unit is not in the first layer by circuitry to read the computational unit input values from the local memory, the circuitry to transmit the plurality of backpropagating results to a corresponding weighted computational unit of the lower-numbered layer when the respective weighted computational unit is not in the first layer includes circuitry to write the plurality of backpropagating results to the local memory, and the circuitry to receive the plurality of error values from the higher-numbered layer when the respective weighted computational unit is not in the last layer includes circuitry to read the plurality of error values from the local memory.

In Example 6, at least one of Examples 4-5 can further include circuitry to subtract a corresponding predefined desired result from each of the plurality of computational function results transmitted to the input/output ports by the weighted computational unit in the last layer to determine the plurality of error values for the computational unit in the last layer, circuitry to transmit the plurality of error values to the processing circuitry for the weighted computational unit in the last layer, and for each of the weighted computational units circuitry to multiply the plurality of backpropagating results transmitted by the respective weighted computational unit by a multiplication factor to determine a plurality of multiplying results, and circuitry to subtract the plurality of multiplying results from the corresponding weights for the respective weighted computational unit to determine updated weights for the respective weighted computational unit.

In Example 7, at least one of Examples 2-6 can further include circuitry to compute updated weight values for each of the weighted computational units according to the backpropagated output error values, and circuitry to transmit the updated weight values to the plurality of weighted computational units.

In Example 8, at least one of Examples 2-7 can further include, wherein the circuitry to interleave forward propagation of computational unit input values from the first layer to the last layer and backpropagation of the output error values from the last layer to the first layer performs the backpropagation when weight values for the respective weighted computational unit are in active memory of the respective weighted computational unit, the weight values used by circuitry to perform computations by the weighted computational units during the interleaved forward propagation and the backward propagation.

In Example 9, at least one of Examples 2-8 can further include, wherein the circuitry to interleave forward propagation of computational unit input values from the first layer to the last layer and backpropagation of the output error values from the last layer to the first layer includes circuitry to multiply the backpropagated error values received by the computational units by corresponding weight values of the respective weighted computational units to produce backpropagating multiplication results, and circuitry to transmit the backpropagating multiplication results to connected one or more weighted computational units of a preceding layer in the order from the first layer to the last layer when the respective weighted computational units are not in the first layer or transmit the backpropagating multiplication results to the input/output port when the respective weighted computational units are in the first layer.

Example 10 includes a method for performing interleaved forward propagation and backward propagation for a deep neural network comprising a plurality of neural network layers coupled in order from a first layer to a last layer, each of the plurality of neural network layers including a plurality of weighted computational units, and input/output ports providing input to and receiving output from the plurality of neural network layers, the method comprising retrieving for the forward propagation and from a remote memory, respective weight values associated with the last layer, storing the retrieved weight values in a local memory of the processing circuitry, while a weight of the respective weight values associated with the last layer is still in the local memory from the forward propagation, backward propagating an output error value from an output of the last layer to an input of the last layer, and providing a result of the backward propagating to the input/output ports.

In Example 11, Example 10 can further include multiplying a plurality of computational unit input values by corresponding weight values to produce a plurality of weighted input values, the plurality of computational unit input values received from a lower-numbered layer of the plurality of neural network layers when the respective weighted computational unit is not in the first layer or received from the input/output ports when the respective weighted computational unit is in the first layer, performing a computational function on the plurality of weighted input values to produce a plurality of computational function results, transmitting the plurality of computational function results to a higher-numbered layer of the plurality of neural network layers when the respective weighted computational unit is not in the last layer or to the input/output ports when the respective weighted computational unit is in the last layer, receiving a plurality of error values from the higher-numbered layer when the respective weighted computational unit is not in the last layer or from the input/output ports when the respective weighted computational unit is in the last layer, each of the plurality of error values corresponding to a different weight value of the respective weighted computational unit, and backpropagating the plurality of error values to the lower-numbered layer when the respective weighted computational unit is not in the first layer or to the input/output ports when the respective weighted computational unit is in the first layer.

In Example 12, Example 11 can further include, wherein backpropagating the plurality of error values includes multiplying the plurality of error values by the corresponding weight values of the respective weighted computational unit to produce a plurality of backpropagating results, and transmitting the plurality of backpropagating results to corresponding ones of the plurality of weighted computational units of the lower-numbered layer when the respective weighted computational unit is not in the first layer or to the input/output ports when the respective weighted computational unit is in the first layer.

In Example 13, Example 12 can further include, wherein transmitting the plurality of computational function results to a higher-numbered layer for the respective weighted computational unit is by writing the plurality of results to a local memory, receiving the plurality of computational unit input values from a lower-numbered layer of the plurality of neural network layers when the respective weighted computational unit is not in the first layer is by reading the computational unit input values from the local memory, transmitting the plurality of backpropagating results to corresponding ones of the plurality of weighted computational units of the lower-numbered layer when the respective weighted computational unit is not in the first layer is by writing the plurality of backpropagating results to the local memory, and receiving the plurality of error values from the higher-numbered layer when the respective weighted computational unit is not in the last layer is by reading the plurality of error values from the local memory.

In Example 14, at least one of Examples 12-13 can further include subtracting a corresponding predefined desired result from each of the plurality of computational function results transmitted to the input/output ports by the plurality of weighted computational units in the last layer to determine the plurality of error values for the plurality of weighted computational units in the last layer, transmitting the plurality of error values to the processing circuitry for the plurality of weighted computational units in the last layer, and for each of the plurality of weighted computational units multiplying the plurality of backpropagating results transmitted by the respective weighted computational unit by a multiplication factor to determine a plurality of multiplying results, and subtracting the plurality of multiplying results from the corresponding weights for the respective weighted computational unit to determine updated weights for the respective weighted computational unit.

In Example 15, at least one of Examples 10-14 can further include computing updated weight values for each of the plurality of weighted computational units according to the backpropagated output error values, and transmitting the updated weight values to the plurality of weighted computational units.

In Example 16, at least one of Examples 10-15 can further include, wherein the backpropagation of the output error values from the last layer to the first layer is performed when weight values for the respective weighted computational units are in active memory of the respective weighted computational units, the weight values used to perform computations by the weighted computational units during both the forward propagation and the backward propagation.

In Example 17, at least one of Examples 10-16 can further include, wherein the backpropagation of the output error values from the last layer to the first layer is performed by multiplying the backpropagated error values received by each of the plurality of weighted computational units by corresponding weight values of the respective weighted computational units to produce backpropagating multiplication results, and transmitting the backpropagating multiplication results to connected one or more weighted computational units of a preceding layer in the order from the first layer to the last layer when the respective weighted computational units are not in the first layer or transmitting the backpropagating multiplication results to the input/output port when the respective weighted computational units are in the first layer.

Example 18 includes at least one non-transitory machine-readable medium including instructions that, when executed by one or more processors, configure processing circuitry for a deep neural network, the deep neural network comprising a plurality of neural network layers coupled in order from a first layer to a last layer, each of the plurality of neural network layers including a plurality of weighted computational units, and input/output ports providing input to and receiving output from the plurality of neural network layers, wherein the one or more processors configure the processing circuitry to interleave forward propagation of computational unit input values from the first layer to the last layer and backpropagation of output error values from the last layer to the first layer.

In Example 19, Example 18 can further include, wherein interleaving forward propagation and backward propagation includes, retrieving for a forward propagation and from a remote memory weights associated with the last layer and storing the retrieved weights in a local memory of the processing circuitry, and while a weight associated with the last layer is still in the local memory from the forward propagation, backward propagating an output error value from an output of the last layer to an input of the last layer, and providing a result of the backward propagating to the input/output ports.

In Example 20, Example 19 can further include instructions that, when executed by the one or more processors, configure the processing circuitry to multiply a plurality of computational unit input values by corresponding weight values to produce a plurality of weighted input values, the plurality of computational unit input values received from a lower-numbered layer of the plurality of neural network layers when the respective weighted computational unit is not in the first layer or received from the input/output ports when the respective weighted computational unit is in the first layer, perform a computational function on the plurality of weighted input values to produce a plurality of computational function results, transmit the plurality of computational function results to a higher-numbered layer of the plurality of neural network layers when the respective weighted computational unit is not in the last layer or to the input/output ports when the respective weighted computational unit is in the last layer, receive a plurality of error values from the higher-numbered layer when the respective weighted computational unit is not in the last layer or from the input/output ports when the respective weighted computational unit is in the last layer, each of the plurality of error values corresponding to a different weight value of the respective weighted computational unit, and backpropagate the plurality of error values to the lower-numbered layer when the respective weighted computational unit is not in the first layer or to the input/output ports when the respective weighted computational unit is in the first layer by multiplying the plurality of error values by the corresponding weight values of the respective weighted computational unit to produce a plurality of backpropagating results and providing the plurality of backpropagating results to corresponding ones of the plurality of weighted computational units of the lower-numbered layer when the respective weighted computational unit is not in the first layer or to the input/output ports when the respective weighted computational unit is in the first layer.

In Example 21, at least one of Examples 19-20 can further include configuring the processing circuitry to transmit the plurality of computational function results to a higher-numbered layer for the respective weighted computational unit includes configuring the processing circuitry to write the plurality of results to a local memory, configuring the processing circuitry to receive the plurality of computational unit input values from a lower-numbered layer of the plurality of neural network layers when the respective weighted computational unit is not in the first layer includes configuring the processing circuitry to read the computational unit input values from the local memory, configuring the processing circuitry to transmit the plurality of backpropagating results to corresponding ones of the plurality of weighted computational units of the lower-numbered layer when the respective weighted computational unit is not in the first layer includes configuring the processing circuitry to write the plurality of backpropagating results to the local memory, and configuring the processing circuitry to receive the plurality of error values from the higher-numbered layer when the respective weighted computational unit is not in the last layer includes configuring the processing circuitry to read the plurality of error values from the local memory.

In Example 22, at least one of Examples 19-21 can further include instructions that, when executed by the one or more processors, configure the processing circuitry to subtract a corresponding predefined desired result from the each of the plurality of computational function results transmitted to the input/output ports by the plurality of weighted computational units in the last layer to determine the plurality of error values for the plurality of weighted computational units in the last layer, transmit the plurality of error values to the processing circuitry for the plurality of weighted computational units in the last layer; and for each of the plurality of weighted computational units multiply the plurality of backpropagating results provided by the respective weighted computational unit by a multiplication factor to determine a plurality of multiplying results; and subtract the plurality of multiplying results from the corresponding weights for the respective weighted computational unit to determine updated weights for the respective weighted computational unit.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the claims, along with the full range of equivalents to which such claims are entitled.

What is claimed is:

1. Processing circuitry for a deep neural network, the processing circuitry comprising:
   a central processing unit (CPU);
   a field programmable gate array (FPGA) with an on-chip static random access memory (SRAM);
   dynamic random access memory (DRAM) remote to the FPGA and the CPU;

input/output ports; and a plurality of neural network neurons organized into layers and implemented by the FPGA, each layer including at least one neuron, the layers organized from a first layer to a second, hidden layer, to a third, last layer, at least one neuron from the first layer is coupled to one or more of the input ports and to at least one neuron of at least one higher numbered layer and the output ports, at least one neuron from the second layer is coupled to at least one of the input ports and the at least one neuron of the first layer and the at least one neuron of at least one higher numbered layer and the output ports, and at least one neuron of the third layer is coupled to the input ports and at least one neuron of at least one lower-numbered layer and to the output ports, each of the plurality of neural network neurons including a weighted computational unit implemented by the CPU to interleave forward propagation of computational unit input values from the first layer to the last layer and backward propagation of output error values from the last layer to the first layer in a sequential manner, wherein interleaving forward propagation and backward propagation includes, retrieving for a forward propagation and from the DRAM, one or more weight values associated with at least one neuron of the last layer and storing the retrieved one or more weight values in the SRAM, and while a weight value associated with the last layer is still in the SRAM from the forward propagation, backward propagating an output error value from an output of the last layer to an input of the last layer using the weight value, providing a result of the backward propagating to the input/output ports, then retrieving for a next forward propagation and from the DRAM, one or more weight values associated with the at least one neuron of the second layer and storing the retrieved one or more weight values in the SRAM, and while the one or more weight values associated with the second layer are still in the SRAM from the next forward propagation, backward propagating an error value to an input of the second layer using the one or more weight values, providing a result of the backward propagating to the input/output ports, and overwriting the one or more weight values stored in the SRAM associated with the at least one neuron with one or more values associated with another neuron after backward propagating the output error value.

2. The processing circuitry of claim 1, wherein each of the weighted computational units includes:

circuitry to multiply a plurality of computational unit input values by corresponding weight values of the weight values to produce a plurality of weighted input values, the plurality of computational unit input values received from an input port of the input ports and/or at least one neuron of the lower-numbered layers;

circuitry to perform a computational function on the plurality of weighted input values to produce a plurality of computational function results;

circuitry to transmit the plurality of computational function results to at least one neuron of a higher-numbered layer and/or at least one of the output ports;

circuitry to receive a plurality of error values from at least one of the output ports and/or a higher-numbered layer, each of the plurality of error values corresponding to a different weight value of the respective weighted computational unit; and circuitry to backpropagate the plurality of error values to at least one neuron of the lower-numbered layer when the respective weighted computational unit is not in the first layer or to the input/output ports when the respective weighted computational unit is in the first layer.

3. The processing circuitry of claim 2, wherein the circuitry to backpropagate the plurality of error values includes:

circuitry to multiply the plurality of error values by the corresponding weight values of the respective weighted computational unit to produce a plurality of backpropagating results; and circuitry to transmit the plurality of backpropagating results to a corresponding weighted computational unit of the lower-numbered layer when the respective weighted computational unit is not in the first layer or to the input/output ports when the respective weighted computational unit is in the first layer.

4. The processing circuitry of claim 3, wherein:

the circuitry to transmit the plurality of computational function results to a higher-numbered layer for the respective weighted computational unit includes circuitry to write the plurality of results to the SRAM;

the one or more computational unit input values are received from a lower-numbered layer of the plurality of neural network layers when the respective weighted computational unit is not in the first layer by circuitry to read the computational unit input values from the SRAM;

the circuitry to transmit the plurality of backpropagating results to a corresponding weighted computational unit of the lower-numbered layer when the respective weighted computational unit is not in the first layer includes circuitry to write the plurality of backpropagating results to the SRAM; and the circuitry to receive the plurality of error values from the higher-numbered layer when the respective weighted computational unit is not in the last layer includes circuitry to read the plurality of error values from the SRAM.

5. The processing circuitry of claim 3, further comprising:

circuitry to subtract a corresponding predefined desired result from each of the plurality of computational function results transmitted to the input/output ports by a weighted computational unit in the last layer to determine the plurality of error values for the computational unit in the last layer;

circuitry to transmit the plurality of error values to the processing circuitry for the weighted computational unit in the last layer; and for each of the weighted computational units:

circuitry to multiply the plurality of transmitted backpropagating results by a multiplication factor to determine a plurality of multiplying results; and circuitry to subtract the plurality of multiplying results from the corresponding weights for the respective weighted computational unit to determine updated weights for the respective weighted computational unit.

6. The processing circuitry of claim 1, further comprising:

circuitry to compute updated weight values for each of the weighted computational units according to the backpropagated output error values; and circuitry to transmit the updated weight values to the plurality of weighted computational units.

7. The processing circuitry of claim 1, wherein the circuitry to interleave forward propagation of computational unit input values from the first layer to the last layer and backpropagation of the output error values from the last layer to the first layer performs the backpropagation when weight values for the respective weighted computational unit are in active memory of the respective weighted computational unit, the weight values used by circuitry to perform computations by the weighted computational units during the interleaved forward propagation and the backward propagation.

8. The processing circuitry of claim 1, wherein the circuitry to interleave forward propagation of computational unit input values from the first layer to the last layer and backpropagation of the output error values from the last layer to the first layer includes:
   circuitry to multiply the backward propagated error values by corresponding weight values of the respective weighted computational units to produce backpropagating multiplication results; and
   circuitry to transmit the backpropagating multiplication results to connected one or more weighted computational units of a preceding layer in an order from the first layer to the last layer for respective weighted computational units that are not in the first layer or transmit the backpropagating multiplication results to the input/output port for respective weighted computational units that are in the first layer.

9. A method for performing interleaved forward propagation and backward propagation for a deep neural network (DNN) implemented in batches on a field programmable gate array (FPGA), the DNN comprising a plurality of neural network layers coupled in order from a first layer to a last layer, each of the plurality of neural network layers including a plurality of weighted computational units, and input/output ports providing input to and receiving output from the plurality of neural network layers, the method comprising:
   retrieving for the forward propagation and from a dynamic random access memory (DRAM) remote to the FPGA, respective weight values associated with the last layer;
   storing the retrieved weight values in a static random access memory (SRAM) on a same board as the FPGA;
   while a weight of the respective weight values associated with the last layer is still in the SRAM from the forward propagation, backward propagating an output error value from an output of the last layer to an input of the last layer;
   providing a result of the backward propagating to the input/output ports;
   then retrieving for a next forward propagation and from the DRAM, one or more weight values associated with the at least one neuron of the second layer and storing the retrieved one or more weight values in the SRAM, and while the one or more weight values associated with the second layer are still in the SRAM from the next forward propagation, backward propagating an error value to an input of the second layer using the one or more weight values, providing a result of the backward propagating to the input/output ports, and overwriting the one or more weight values stored in the SRAM associated with the at least one neuron with one or more values associated with another neuron after backward propagating the output error value.

10. The method of claim 9, further comprising:
   multiplying a plurality of computational unit input values by corresponding weight values to produce a plurality of weighted input values, the plurality of computational unit input values received from a lower-numbered layer of the plurality of neural network layers when the respective weighted computational unit is not in the first layer or received from the input/output ports when the respective weighted computational unit is in the first layer;
   performing a computational function on the plurality of weighted input values to produce a plurality of computational function results;
   transmitting the plurality of computational function results to a higher-numbered layer of the plurality of neural network layers when the respective weighted computational unit is not in the last layer or to the input/output ports when the respective weighted computational unit is in the last layer;
   receiving a plurality of error values from the higher-numbered layer when the respective weighted computational unit is not in the last layer or from the input/output ports when the respective weighted computational unit is in the last layer, each of the plurality of error values corresponding to a different weight value of the respective weighted computational unit; and
   backpropagating the plurality of error values to the lower-numbered layer when the respective weighted computational unit is not in the first layer or to the input/output ports when the respective weighted computational unit is in the first layer.

11. The method of claim 10, wherein backpropagating the plurality of error values includes:
   multiplying the plurality of error values by the corresponding weight values of the respective weighted computational unit to produce a plurality of backpropagating results; and
   transmitting the plurality of backpropagating results to corresponding ones of the plurality of weighted computational units of the lower-numbered layer when the respective weighted computational unit is not in the first layer or to the input/output ports when the respective weighted computational unit is in the first layer.

12. The method of claim 11, wherein:
   transmitting the plurality of computational function results to a higher-numbered layer for the respective weighted computational unit is by writing the plurality of results to the SRAM;
   receiving the plurality of computational unit input values from a lower-numbered layer of the plurality of neural network layers when the respective weighted computational unit is not in the first layer is by reading the computational unit input values from the SRAM;
   transmitting the plurality of backpropagating results to corresponding ones of the plurality of weighted computational units of the lower-numbered layer when the respective weighted computational unit is not in the first layer is by writing the plurality of backpropagating results to the SRAM; and
   receiving the plurality of error values from the higher-numbered layer when the respective weighted computational unit is not in the last layer is by reading the plurality of error values from the SRAM.

13. The method of claim 11, further comprising:
   subtracting a corresponding predefined desired result from each of the plurality of computational function results transmitted to the input/output ports by a plurality of weighted computational units in the last layer to determine the plurality of error values for the plurality of weighted computational units in the last layer;

transmitting the plurality of error values to the processing circuitry for the plurality of weighted computational units in the last layer; and for each of the plurality of weighted computational units:
multiplying the plurality of transmitted backpropagating results by a multiplication factor to determine a plurality of multiplying results; and
subtracting the plurality of multiplying results from the corresponding weights for the respective weighted computational unit to determine updated weights for the respective weighted computational unit.

14. The method of claim 9, further comprising:
computing updated weight values for each of the plurality of weighted computational units according to the backpropagated output error values; and
transmitting the updated weight values to the plurality of weighted computational units.

15. The method of claim 9, wherein the backpropagation of the output error values from the last layer to the first layer is performed by:
multiplying the backward propagated error values by corresponding weight values of the respective weighted computational units to produce backpropagating multiplication results; and
transmitting the backpropagating multiplication results to connected one or more weighted computational units of a preceding layer in an order from the first layer to the last layer for respective weighted computational units that are not in the first layer or transmitting the backpropagating multiplication results to the input/output port for respective weighted computational units that are in the first layer.

16. At least one non-transitory machine-readable medium including instructions that, when executed by one or more processors, configure processing circuitry of a field programmable gate array (FPGA) to implement a deep neural network (DNN) in batches, the DNN comprising a plurality of neural network layers coupled in order from a first layer to a last layer, each of the plurality of neural network layers including a plurality of weighted computational units, and input/output ports providing input to and receiving output from the plurality of neural network layers, wherein the one or more processors configure the processing circuitry to:
interleave forward propagation of computational unit input values from the first layer to the last layer and backpropagation of output error values from the last layer to the first layer by:
retrieve for the forward propagation and from a dynamic random access memory (DRAM) remote to the FPGA, respective weight values associated with the last layer;
store the retrieved weight values in a static random access memory (SRAM) on a same board as the FPGA;
while a weight of the respective weight values associated with the last layer is still in the SRAM from the forward propagation, backward propagating an output error value from an output of the last layer to an input of the last layer;
provide a result of the backward propagating to the input/output ports;

then retrieving for a next forward propagation and from the DRAM, one or more weight values associated with the at least one neuron of the second layer and storing the retrieved one or more weight values in the SRAM, and while the one or more weight values associated with the second layer are still in the SRAM from the next forward propagation, backward propagating an error value to an input of the second layer using the one or more weight values, providing a result of the backward propagating to the input/output ports, and
overwrite the one or more weight values stored in the SRAM associated with the at least one neuron with one or more values associated with another neuron after backward propagating the output error value.

17. The non-transitory machine-readable medium of claim 16, further including instructions that, when executed by the one or more processors, configure the processing circuitry to:
multiply a plurality of computational unit input values by corresponding weight values to produce a plurality of weighted input values, the plurality of computational unit input values received from a lower-numbered layer of the plurality of neural network layers when the respective weighted computational unit is not in the first layer or received from the input/output ports when the respective weighted computational unit is in the first layer;
perform a computational function on the plurality of weighted input values to produce a plurality of computational function results;
transmit the plurality of computational function results to a higher-numbered layer of the plurality of neural network layers when the respective weighted computational unit is not in the last layer or to the input/output ports when the respective weighted computational unit is in the last layer;
receive a plurality of error values from the higher-numbered layer when the respective weighted computational unit is not in the last layer or from the input/output ports when the respective weighted computational unit is in the last layer, each of the plurality of error values corresponding to a different weight value of the respective weighted computational unit; and
backpropagate the plurality of error values to the lower-numbered layer when the respective weighted computational unit is not in the first layer or to the input/output ports when the respective weighted computational unit is in the first layer by multiplying the plurality of error values by the corresponding weight values of the respective weighted computational unit to produce a plurality of backpropagating results and providing the plurality of backpropagating results to corresponding ones of the plurality of weighted computational units of the lower-numbered layer when the respective weighted computational unit is not in the first layer or to the input/output ports when the respective weighted computational unit is in the first layer.

* * * * *